July 29, 1924.

M. BALCKER

PRESSURE PAD

Filed Feb. 6, 1922

Inventor: Martin Balcker

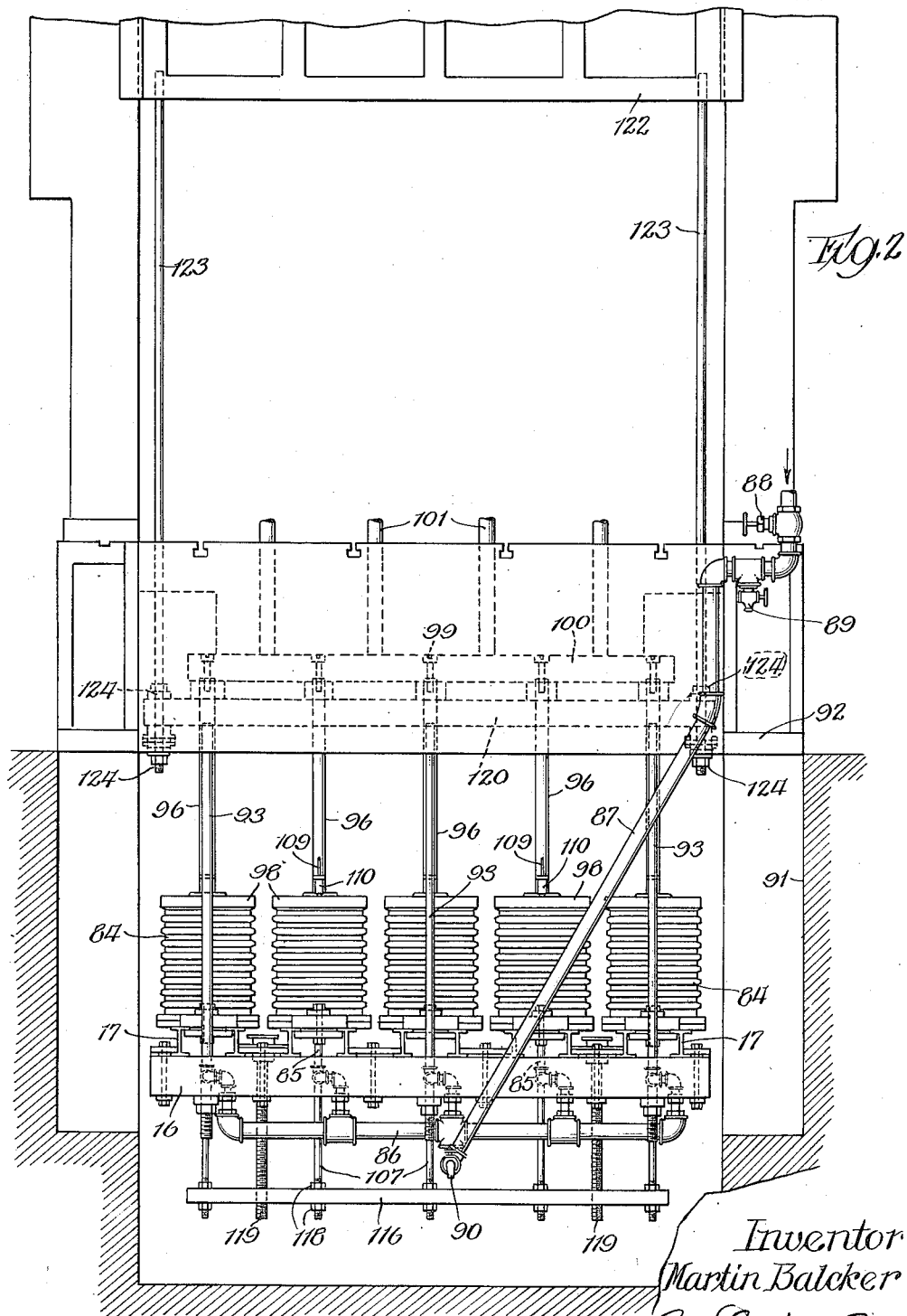

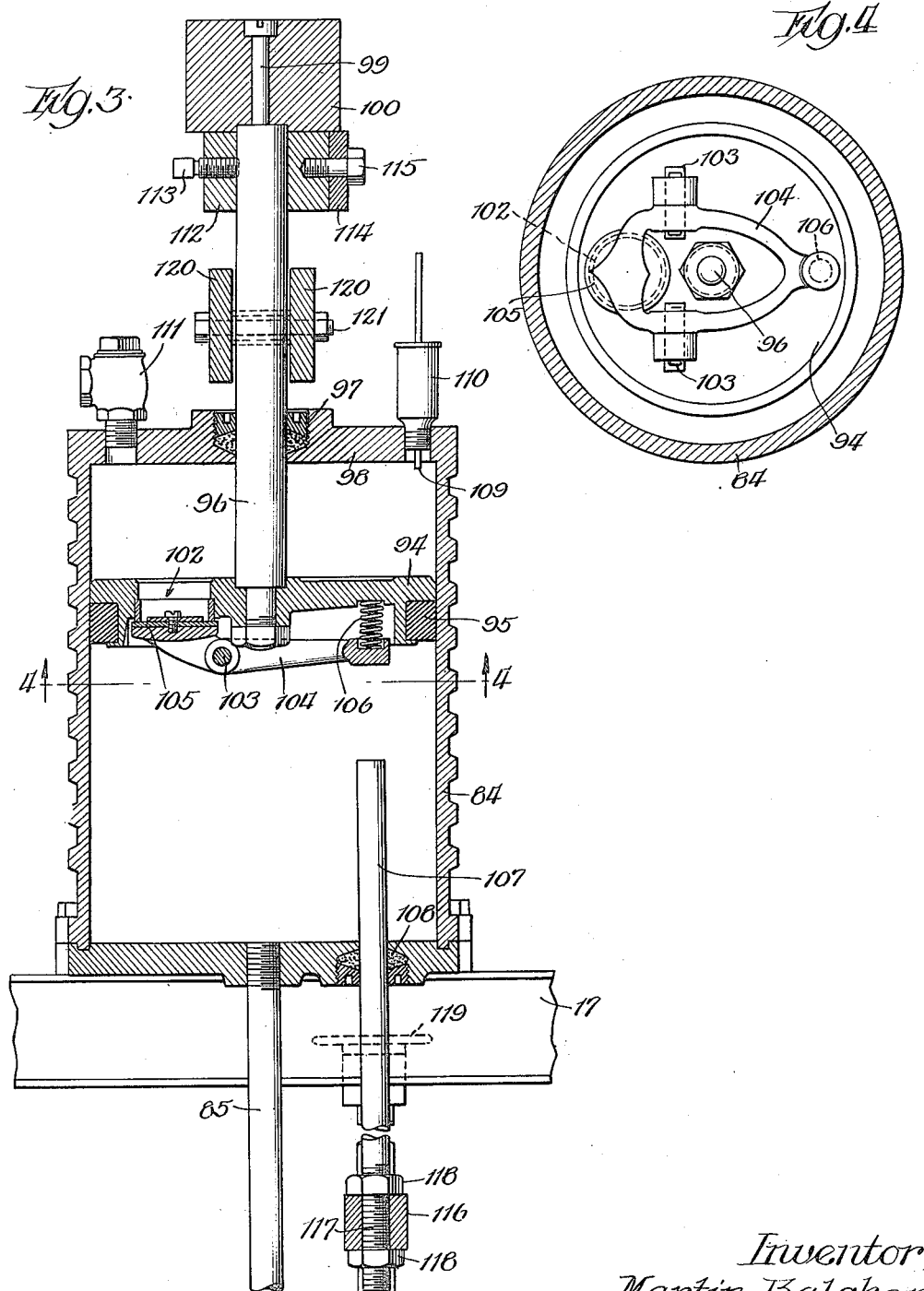

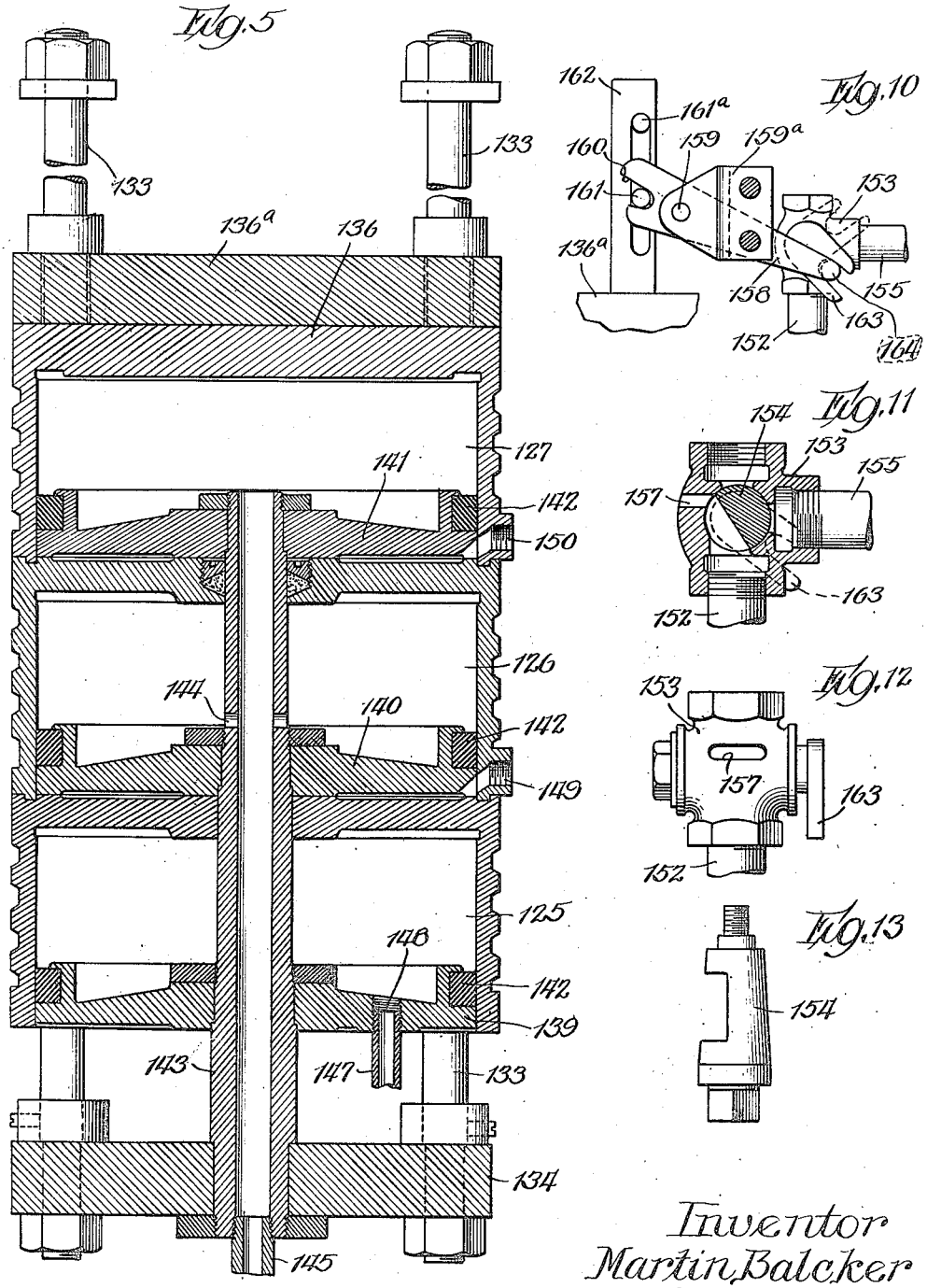

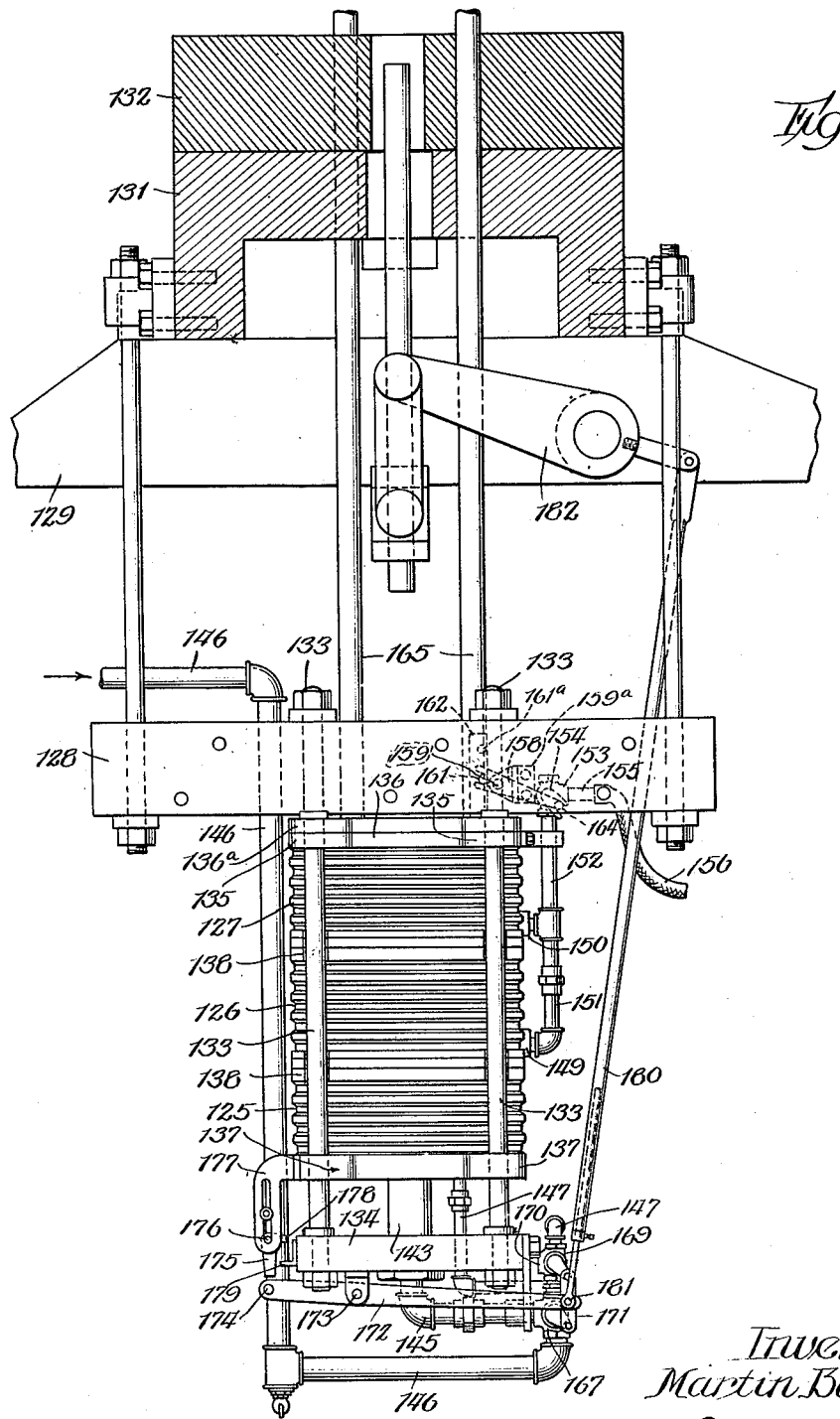

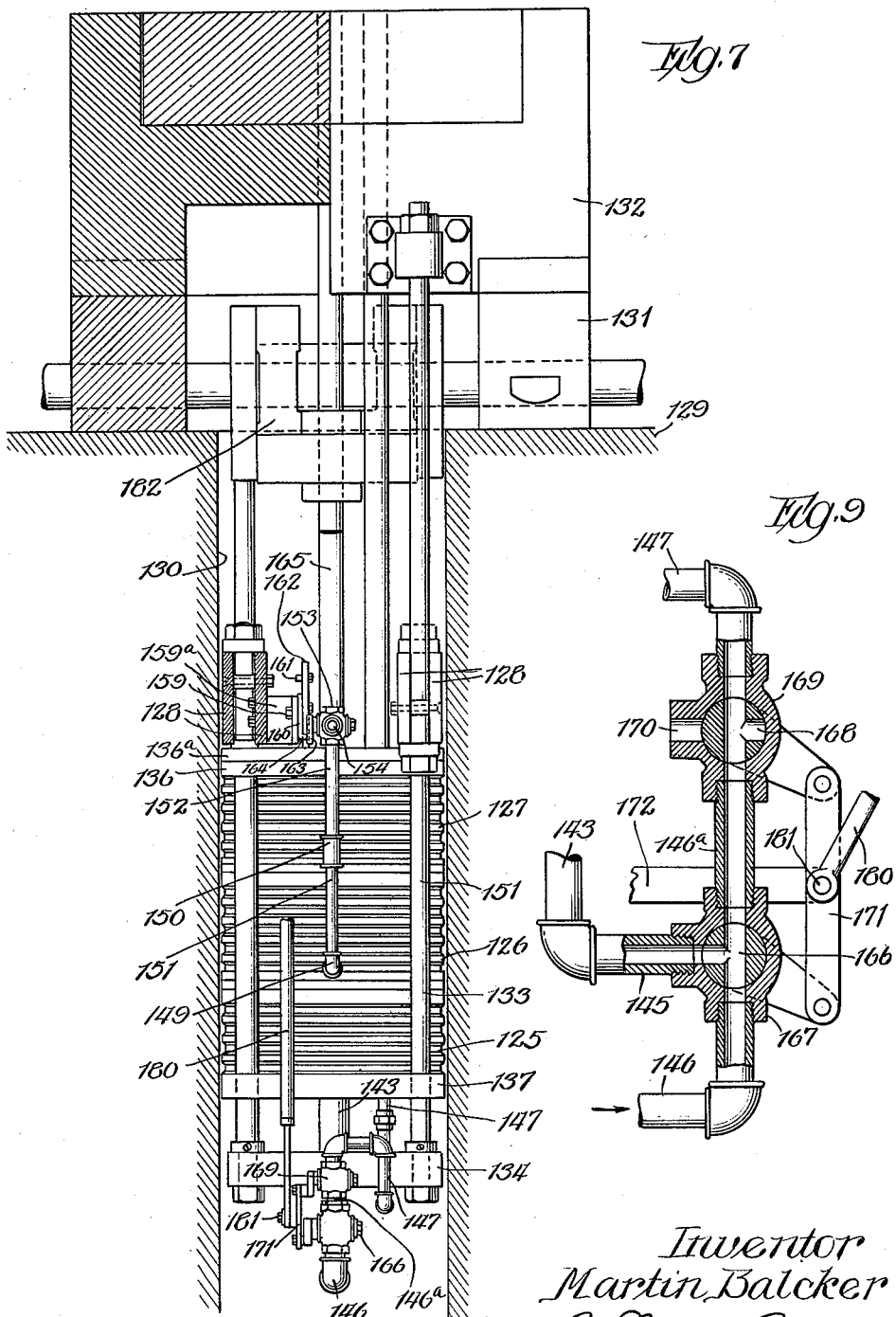

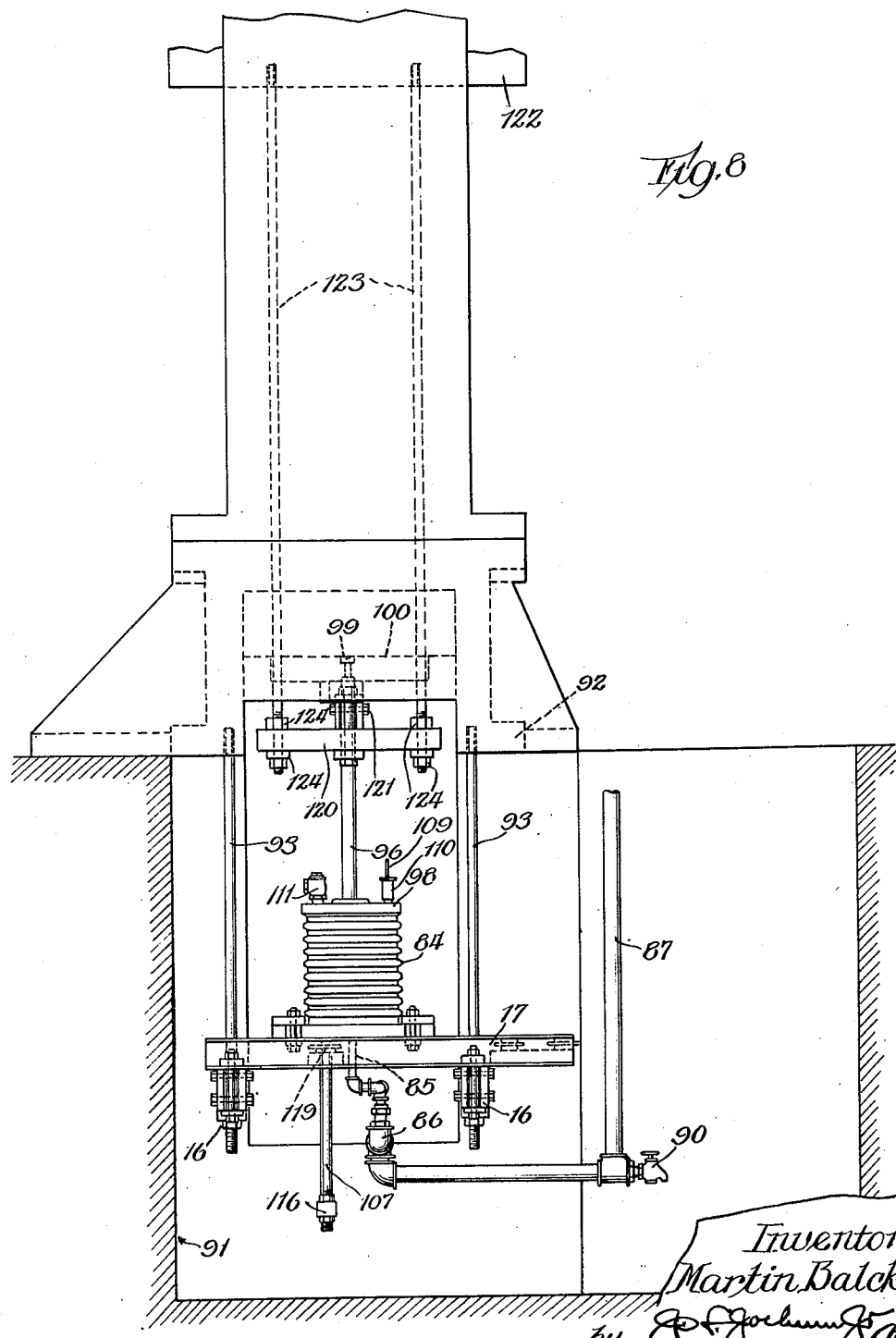

Patented July 29, 1924.

1,503,105

UNITED STATES PATENT OFFICE.

MARTIN BALCKER, OF CHICAGO, ILLINOIS, ASSIGNOR TO MARQUETTE TOOL & MANUFACTURING CO., OF CHICAGO, ILLINOIS, A CORPORATION OF ILLINOIS.

PRESSURE PAD.

Application filed February 6, 1922. Serial No. 534,296.

*To all whom it may concern:*

Be it known that I, MARTIN BALCKER, a citizen of the United States, residing at Chicago, in the county of Cook and State of Illinois, have invented certain new and useful Improvements in Pressure Pads, of which the following is a specification.

Heretofore in metal stamping presses the article has been shaped in a die, the upper part of which is fastened to the ram of the press. After the completion of the shaping operation the ram recedes, and the pressure pad, with the pressure means active follows up to its original position.

If the pressure pad is allowed to immediately follow the receding portion of the die, the article will be injured or distorted by the action of the upward pressure of the pad, and upon which pad a portion of the article rests.

It has heretofore been attempted to overcome these difficulties and objections by arresting the movement of the pressure pad at the limit of its downward movement, or at the point where the shaping operation has been completed. However, it has been found in actual practice with mechanical devices, that the mere arresting of the pad is not sufficient, because under certain conditions the lost motion between the parts will still allow the pressure pad to immediately follow the ram to a sufficient extent to injure the article.

It is one of the objects of the present invention to overcome these difficulties and objections by the provision of improved means which will operate at a predetermined period in the cycle of operation, to entirely relieve or remove the active pressure upon the pad.

A further object is to provide improved fluid controlled means for influencing the pressure pad and the provision of mechanisms whereby the fluid controlled means may itself be controlled.

A further object is to provide an improved pressure pad of this character which will be simple, durable and compact in construction, and effective and efficient in operation.

To the attainment of these ends and the accomplishment of other new and useful objects as will appear, the invention consists in the features of novelty in substantially the construction, combination and arrangement of the several parts, hereinafter more fully described and claimed and shown in the accompanying drawings illustrating this invention and in which—

Figure 2 is a detail side elevation of another form of the invention.

Figure 3 is an enlarged detail vertical sectional view of one of the fluid controlled portions.

Figure 4 is a horizontal sectional view taken on line 4—4, Figure 3.

Figure 5 is a detail vertical sectional view of another form of the invention.

Figure 6 is a view partly in elevation, partly in section and partly broken away of a mechanism embodying the form shown in Figure 5.

Figure 7 is a right hand view of Figure 6.

Figure 8 is a detail end elevation of Figure 2 with parts omitted.

Figure 9 is an enlarged detail view partly in elevation and partly in section of the valves for controlling the delivery of the fluid to and from the top sides of the pistons.

Figure 10 is a detail view of the valve for controlling the fluid on the bottom of the pistons, and the valve operating mechanism.

Figure 11 is a sectional view of the valve and casing.

Figure 12 is an elevation of one face of the valve casing.

Figure 13 is a detail view of the valve proper.

Figure 1:
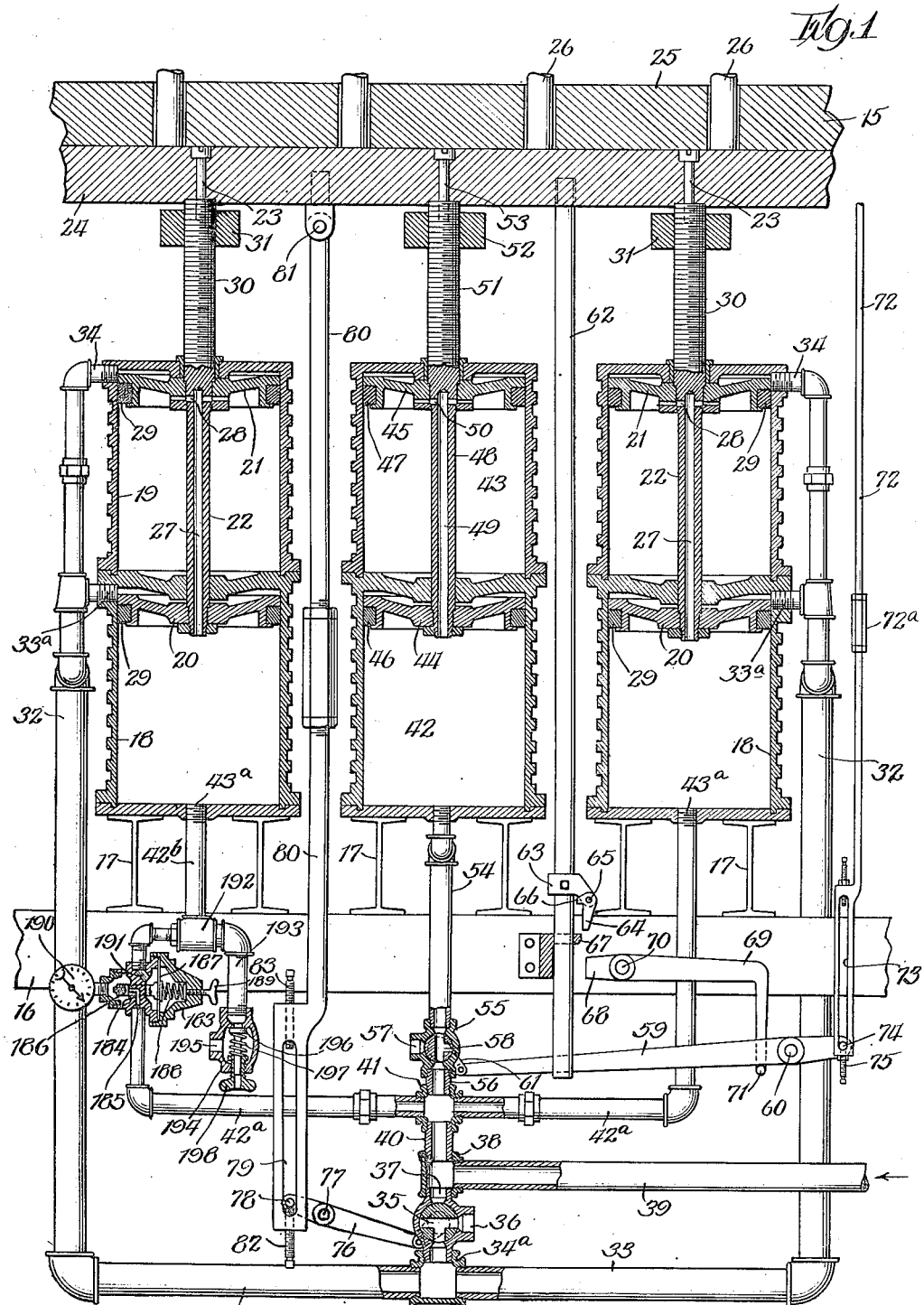
Figure 1 is a view partly in elevation and partly in vertical section of a pressure pad constructed in accordance with the principles of this invention.

Referring more particularly to the drawings and in Figure 1, the numeral 15 designates the bolster plate of the press beneath which is arranged a supporting member 16, which is held in position in any desired or suitable manner. The pressure pad and the fluid controlling means therefor is mounted upon the support 16 preferably upon suitable I-beams 17, and embodies a plurality of double cylinders 18—19, which may be of any desired size and configuration. A piston 20 is arranged within each of the cylinders 18 and a similar piston 21 is arranged within each of the cylinders 19. The respective pistons 20—21 are connected by means of a piston rod 22, which passes through the heads of the cylinders and extends for some distance beyond the upper cylinder, the upper ends of the piston rods being connected in any suitable manner, such as by means of fastening bolts 23 with a pressure pad or pin supporting plate 24, which latter is adapted to assume a position at the limit of its upward movement when the pistons are in proximity to the upper ends of the cylinders. The bolster plate is provided with suitable openings 25, through which pins 26 pass and which pins rest upon the pad or plate 24. These pins 26 support a draw ring common in dies used in machines of this character.

Any number of pairs of cylinders 18—19 may be employed and as the construction and operation of each of the respective pairs of cylinders 18—19 is the same, the description of one will apply equally as well to them all.

The piston rod 22 is provided with a tubular portion 27 open at its lower end to form communication with the cylinder 18 and the rod is provided with openings 28 therethrough adjacent and beneath the piston 21, forming communication with the interior of the cylinder 19, so that fluid entering the cylinder 18 will pass through the tubular portion 27 of the piston rod and the openings 28 into the upper cylinder 19.

Encompassing the peripheries of the pistons 20 and 21 are suitable packing rings 29, to form fluid tight joints between the pistons and the cylinder walls.

If desired the upper portion of the piston rods 22 may be provided with threads 30 upon which collars 31 are screwed so as to limit the movement of the pistons 20 and 21 in one direction in the respective cylinders.

A pipe 32 has communication as at 33ª with the cylinder 18 between the upper head thereof and the upper face of the piston 20. This pipe also has communication as at 34 with the upper portion of the cylinder 19 between the head thereof and the upper face of the piston 21. The pipes 32 of the respective pairs of cylinders 18—19 are connected by means of pipes 33 with a coupling 34ª, which has therein a three way valve 35, the valve casing having communication as at 36 with the atmosphere and also as at 37 with the coupling 38 with which a fluid supply pipe 39 has communication.

Connected with the coupling 38 is a pipe 40 which in turn has communication with a coupling 41, leading from which latter coupling are branch pipes 42ª, which have communication with the lower cylinders 18 through the bottoms thereof as at 43ª, and through which pipes 42ª fluid is supplied through the pipe 39 into the bottoms of the cylinders 18, a portion of which fluid will flow into the cylinders 19, through the tubular portion of the piston rod 22 to raise the pistons and with it the pressure pad or pin plate 24. As the pistons are thus raised and when the valve 35 is in the position shown in Figure 1, the fluid between the pistons 20 and 21 and the tops of the respective cylinders 18—19 will be forced through the pipe connections 33ª—34, into the pipe 32, from there into the pipe 33, through the valve 35, and into the atmosphere through the discharge opening 36.

When the valve 35 is adjusted so as to close the discharge outlet 36 and establish communication between the pipes 33 and the pipe 39 through the valve 35 and outlet 37, which will occur at a predetermined point in the descending movement of the pin plate or pad 24, to establish communication between the supply pipe 39 and the cylinders 18—19 on the upper sides of the pistons 20—21, the pressure on both sides of the pistons in the cylinders 18 and 19 will be neutralized, with the result that no active pressure upward is being exerted upon the pressure pad or plate 24, for a purpose to be hereinafter set forth.

Any number of additional pairs of cylinders 42—43 are arranged intermediate the pairs of cylinders 18—19. The cylinder 42 is provided with a piston 44 and the cylinder 43 is provided with a piston 45, respectively provided with any suitable packing 46—47, similar to the packing 29. These pistons 44—45 are connected by means of a piston rod 48 having a tubular portion 49, the latter forming communication between the two cylinders 42—43, through the open bottom thereof and outlets 50. The piston rod passes through the heads of the cylinders and the upper end of the rod may be threaded as at 51 to receive a collar 52, the piston rod being secured to the pin plate or pressure pad 24 in any suitable manner such as by means of a fastening device 53.

Leading from the bottom of the cylinder 42 is a pipe 54 which has connection with the coupling 55, the latter having communication with the coupling 41, through the medium of the pipe 56. This coupling 55 has an outlet 57 discharging to the atmosphere. Within the coupling 55 is a three way valve 58 of any ordinary and well known construction, adapted to form communication between the pipes 54 and 56, at the same time closing the discharge outlet 57, and is also adapted when shifted to close communication with the pipe 56, and establish communication between the pipe 54 and the outlet 57, to allow fluid in the cylinders 42—43 to be discharged to the atmosphere.

It will be seen from Figure 1 that when the valve 58 is in the position shown, communication will be established between the supply pipe 39 to the bottom cylinders 18, 42, and it will also be seen that the valve 58 may be adjusted to cut off communication between the bottom cylinder 42 and the supply pipe 39, while communication is established between the pipe 54 and the outlet 57.
When the valve 58 is thus adjusted, communication will be still maintained between the cylinders 18 and the supply pipe 39.

The valve 58 is adapted to be shifted in any suitable manner, preferably by means of an arm or lever 59 pivotally mounted intermediate its ends as at 60, one end of the lever being connected by means of a suitable connection 61 with the valve 58. This lever 59 is adapted to be automatically shifted when the pressure pad or plate 24 reaches a predetermined limit in its downward movement, and this may be accomplished in any suitable manner, preferably by means of a bar or rod 62, depending from the pressure pad or pin plate 24. Adjustably mounted upon this rod 62 is a collar 63 having a trip 64 pivotally mounted thereupon as at 65 and the trip is provided with a nose or finger portion 66, adapted to engage a bracket or projection 67, preferably carried by the support 16, through which bracket the rod 62 is guided. Arranged within the path of movement of the trip 64, is one end 68 of an arm 69 pivotally mounted as at 70, the extremity 71 of the arm being shaped to extend beneath the lever 59, so that when the trip 64 descends and engages the end 68 of the arm 69, the extremity 71 of the arm will be raised and this extremity will in turn rock the lever 59 to shift the valve 58.

The nose or projection 66 on the catch 64, which engages the portion 67 of the bracket is provided for the purpose of causing the trip 64 to be rocked about its pivot to position the same to engage the end 68 of the arm 69 to slide thereacross during the rocking movement of the arm.

The valve 58 is adapted to be rotated or moved in the opposite direction when the pressure pad or pin plate 24 rises, in any suitable manner preferably by means of a bar or rod 72 preferably provided with a turn button 72ª, which is connected with any suitable movable portion of the press such as the mechanical knock out or to the crank shaft or crank which operates the ram. This rod 72 is provided with an elongated slot 73 at one end thereof into which slot a lateral projection 74 on the lever 59 extends. When the rod 72 ascends the bottom of the slot 73 will engage the projection 74 of the arm 59 to rock the latter and shift the valve. If desired an adjustable member 75 in the form of a screw may be provided in the bottom of the slot 73 so as to vary, as desired, the time during the cycle of operation of the mechanism at which the lever 59 will be rocked.

The valve 35 is adapted to be automatically shifted in any desired or suitable manner and to that end there may be provided a lever 76, pivotally mounted intermediate its ends as at 77, one end of the lever 76 being connected with the valve 35 and the other end of the lever being provided with a lateral projecting portion 78, which projects into an elongated slot 79 in a bar or rod 80, which is connected as at 81 with the pressure pad or pin plate 24, preferably by being pivotally secured thereto. As the rod 80 rises the lever 76 will be shifted in one direction by means of the projection 78 thereon engaging the bottom of the slot 79 and this will move the valve 35 in one direction. As the rod 80 descends the projection 78 will be engaged by the top of the slot 79 to shift the lever 76 to move the valve 35 in the opposite direction. If desired an adjustable element 82 may be provided in the bottom of the slot 79 and a similar adjustable element 83 may be provided in the top of the slot to engage the projection 78 on the lever 76, and through the medium of which adjustable elements 82 and 83 the time of operation of the valve 35 may be varied at will.

While in Figure 1, two sets of cylinders 18—19, and one set of cylinders 42—43 are shown and described, it is to be understood that these parts may be duplicated as many times as desired according to the press to which they are to be applied and in that event the pipes may be connected by means of the usual couplings or a separate set of supply pipes leading from the same source of supply may be connected with the additional cylinders.

It is thought that from the above the operation of this form of the invention will be readily understood, but briefly stated it is as follows. The normal position of the parts is as shown in Figure 1, that is with the pistons in the cylinders in close proximity to the cylinder heads and the pin plate at the limit of its upward movement. When the pistons have assumed this position, the valve 58 will be positioned to establish communication between the bottom cylinder 42 through the pipe 54 with the supply pipe 39. At the same time the valve 35 will be in a position to cut off communication between the tops of the cylinders and the supply pipe 39 and establish communication between the tops of the cylinders and the outlet 36, delivering to the atmosphere.

As the press is operated and the draw ring is depressed, such movement of the draw ring will, through the medium of the pins 26 depress the pressure pad or pin plate 24. This will cause the pistons in all of the cylinders to descend forcing the fluid from beneath the bottoms of all of the pistons back to the supply pipe 39. As the pressure pad or pin plate 24 descends the rod 62 descends until the trip 64 rocks the arm 69 to rock the lever 59 and shift the valve 58 to establish communication between the cylinders 42—43 and the atmosphere through the opening 57 in the coupling 55, at the same time shutting off communication between the cylinder 42 and the supply pipe 39. This will, at a predetermined distance of movement of the pressure pad or pin plate 24 cause the cylinders 42—43 to become inactive but the pressure will remain active in the cylinders 18—19.

During the descending movement of the pad or plate 24 the rod 80 descends until the end of the screw 83 engages the projection 78 on the lever 76 to rock the latter and shift the valve 35 to establish communication between the supply pipe 39 and the pipes 33 which communicate through the pipes 32 and connections 33ª—34 to the upper sides of the pistons 20—21 in the cylinders 18—19, so that the pressure on both sides of the pistons in the cylinders 18 and 19 will be neutralized with the result that as the cylinders and pistons 42—43—44—45 having been rendered inactive and the pressure in the cylinders 18 and 19 on both sides of the respective pistons 20 and 21 being neutralized, and as no upward pressure is then being exerted upon the pad or plate 24, the pressure pad or pin plate 24 will gravitate by means of the weight of the parts. This gravitating or downward movement of the pad or plate 24 may be limited or controlled through the medium of the adjustable collars 31—52.

This gravitation, however, of the pressure pad or pin plate will not be effected until desired, or until after the completion of the forming operation upon the press.

When the ram of the press recedes the lever 59 will be rocked about its pivot 60, through the medium of the bar or rod 72, when the screw 75 engages the projection 74 on the lever. This will shift the valve 58 to establish communication between the supply pipe 39 and the bottom sides of the pistons 44—45 in the respective cylinders 42—43, so that the pressure will then act upon these pistons to raise the pressure pad or pin plate 24.

As the pad or plate 24 is being raised by this pressure in the cylinders 42—43, the pistons 20 and 21 in the cylinders 18—19 are being drawn up or raised by the pad or plate 24, and the fluid in the tops of the cylinders 18—19 on the upper sides of the respective pistons will be forced through the connections 33ª—34, pipes 32 and 33, back to the supply pipe 39 through the valve 35, which has been previously adjusted to establish communication between the pipes 33 and 39. At a predetermined time in the upward movement of the pistons, the screw 82 in the end of the slot 79 of the rod 80 will engage the projection 78 on the lever 76 to establish communication between the pipes 33 and the atmosphere through the outlet 36 of the valve casing 35, thereby again shutting off communication between the pipes 33 and the supply pipe 39.

In the form of the invention shown in Figures 2 to 4, a single cylinder and piston is employed in lieu of the double cylinders and pistons. The cylinders 84, any number of which may be employed, are secured to the supports 16 in any suitable manner and communicating with the cylinder, preferably through the bottom thereof is a pipe 85, the pipes 85 of all of the cylinders being preferably connected by means of a manifold 86 to which in turn is connected a pipe 87 leading from the source of supply of fluid. A valve 88 may be provided in the pipe 87 for controlling the flow of fluid therethrough and if desired drain cocks 89—90 may also be provided in the pipe 87.

In this form of the invention the cylinders 84 are adapted to be arranged within a pit 91 below the bed 92 of the press and the support 16 is held in position preferably by means of rods 93, any number of which may be provided, and which rods are anchored to the base of the machine.

As the construction and operation of each of these cylinders in this form of the invention, are the same the specific description of one will apply equally as well to them all.

Reciprocating in the cylinder 84 is a piston 94, provided with any suitable packing 95 arranged about the periphery thereof. Connected with the piston is a piston rod 96 which passes through suitable packing 97 in the top 98 of the cylinder. This piston rod is of a length to extend for any desired distance above the bed plate 92 and secured to the pistons in any suitable manner, such as by means of a fastening device 99 to a pressure pad or pin supporting plate 100, which corresponds with the pad or plate 24 in the form shown in Figure 1.

Pins 101 engage and rest upon the pad or plate 100 and it is upon these pins that the usual draw ring rests.

The piston 94 is provided with an opening 102 therethrough (see particularly Figure 3) which may be of any desired or suitable size. Pivotally mounted intermediate its ends and upon the piston as at 103, is an arm 104, one end of which carries a valve 105, adapted to close the opening or passage 102. Interposed between the other end of the arm 104 and the piston 94 is a spring 106, one end of which has a bearing against each of the elements and the normal tendency of the spring is to move the arm 104 in a direction to seat the valve 105 and close the opening or passage 102. The spring 106 is of a sufficient tension to overcome, at a predetermined point in the operation of the piston, the pressure above the piston so that the pressure above the piston will not interfere with the closing of the passage 102 at the proper time.

Projecting into the cylinder 84 through the bottom thereof is a bar or rod 107, which extends through a suitable packing box 108. The upper end of this rod 107 is arranged in the path of movement of the end of the arm 104 opposite to the valve carrying end so that when the piston 94 travels a predetermined distance, which is determined by the position of the bar or rod 107, the end of the arm 104 will engage the end of the bar or rod 107 and the arm 104 will be rocked to open the passage 102 against the tension of the spring 106 and thereby allow the fluid beneath the piston to pass through the passage 102 to the other side of the piston and to equalize the pressure on both sides of the piston.

As the piston ascends after the passage 102 is closed it will be manifest that the pressure on the upper side of the piston will be increased but the spring 106 is of such a tension that this increased pressure will open the passage 102. The pressure on both sides of the piston will be equalized. The piston 94 will then travel upwardly until the piston engages the end of an adjustable stem 109 of a relief valve 110, which latter may be of any ordinary and well known construction. Upon a further movement of the piston 94 in the same direction the relief valve 110 will be opened and the fluid above the piston will be discharged to the atmosphere allowing the spring 106 and the pressure on the bottom of the piston to cause the valve to close the passage 102.

If desired a check valve 111 may also be provided which operates automatically to admit atmospheric air into the top of the cylinder above the piston when the piston is moving downwardly.

The downward movement of the pad or pin plate may be controlled or varied by means of a suitable collar 112 adjustably connected with the piston rod 96 by means of a suitable fastening device 113, and if desired, and in order to insure the same adjustment of each of the collars 112 upon the piston rods 96, these collars may be connected by means of a suitable connecting bar or rod 114 secured to the collars by a suitable fastening device 115.

The bars or rods 107 which open the valve 105 may be adjusted in any suitable manner but a simple and efficient means for simultaneously adjusting them, embodies a member 116 through which the threaded end 117 of the rod passes and the rod is secured to this member 116 by suitable nuts or collars 118 engaging the threads.

Mounted upon the support 16 preferably by passing therethrough are any desired or suitable number of threaded shafts 119, the upper ends of which are rotatably mounted in the support 16, while the other ends of the shafts have threaded engagement with the member 116 so that when the shafts 119 are rotated the member 116 will be moved toward or away from the support 16 according to the direction of rotation of the shaft 119 and this will cause the bars or rods 107 to be moved for adjustment through the packing boxes 108.

Any suitable means may be provided for simultaneously rotating the shafts 119 such for instance as by means of any suitable driving connection between the shafts (not shown) or they may be separately rotated. The operating mechanisms for these shafts 119 are arranged in a convenient position for the operator.

Suitable means may also be provided for raising the pistons 94 through the medium of the die cage or any other movable portion of the press. A suitable and efficient means embodies spaced members 120 arranged on opposite sides of the piston rods 96, above the cylinder heads 98. These members 120 may be fastened together by means of suitable fastening devices 121 and the members 120 and piston rods 96 are adapted for a free reciprocating motion one with respect to the other. Connected with the die cage 122 are rods 123, the lower ends of which pass between the members 120 and the members 120 are secured to the rods 120 preferably by means of suitable nuts or collars 124 secured to the rods on the opposite sides of the members 120. It will therefore be seen that when the die cage 122 descends the members 120 will in no manner affect or be affected by the movement of the piston rods 96. When the die cage or any portion of the ram to which the rods 123 are secured, ascends the members 120 will engage the collars 112, and thereby raise the pistons 94.

It is thought that the operation of this form of the invention will be clearly understood from the foregoing but briefly stated it is as follows. The normal position of the piston 94 is adjacent the top head 98 of the cylinder and when the draw ring is depressed the pressure pad or plate 100 will through the medium of the pins 101 be also depressed, causing the piston 94 to descend against the fluid pressure in the bottom of the cylinder, and which fluid pressure is admitted from the source of supply through the pipe 85. The piston 94 will descend against this pressure until the arm 104 is tripped or rocked by the end of the rod 107. This will open the passage 102 through the piston and permit the fluid which is beneath the piston 94 to pass therethrough to the top side of the piston thereby equalizing the pressure in the cylinder. The rod 107 is so set or positioned that the passage 102 in the piston will be opened at any desired point or at the limit of the downward stroke of the ram or at the point in the operation at the completion of the shaping or forming of the article. After the passage 102 is opened and some of the fluid beneath the piston passes to the upper side of the piston to neutralize the pressure on the piston, the piston together with the pressure pad or pin supporting plate 100 as well as the draw ring will gravitate a sufficient distance to permit the ram to start to recede in advance of the receding movement of the draw ring to prevent injury to the article which has been shaped. This gravitating movement is accomplished by reason of the fact that the piston 94 will move downwardly under the weight of the parts a sufficient distance after the passage 102 has been opened.

When the ram continues to recede the pistons 94 will be elevated through the medium of the rods 123 and the members 120. During the receding movement the passage 102 will be opened and any increased pressure which will be created in the cylinder above the piston will be allowed to pass below the piston through the passage 102 to equalize the pressure on both sides of the piston.

In the form of the invention shown in Figures 5 to 7, the pressure pad embodies a plurality of superposed cylinders or chambers 125—126—127, preferably three in number, and these cylinders are supported preferably by means of stationary beams 128, which in turn are supported by the foundation 129 of the press to depend therebelow and into a pit 130 under the machine, the press bed 131 resting upon the foundation 129 and the bolster plate 132 is supported above the press bed.

The cylinders are held in position preferably by means of fastening rods or bolts 133, which are connected with a stationary beam 128 and also with a supporting member 134, the bolts pass through suitable guides or ears 135 on the top plate 136 of the uppermost cylinder and similar guides or ears 137 on the lowermost cylinder 125, intermediate guides 138 being provided on the other cylinders so that the cylinders will have a free reciprocating movement upon the bolts 133.

Pistons 139—140—141 are arranged respectively in the cylinders 125—126—127, each of the pistons being preferably provided with packing rings 142.

Mounted upon the support 134 is a tubular piston rod 143 to which the pistons 139—140 and 141 are secured. The piston rod 143 is provided with openings 144 above the piston 140, so as to form communication between the interior of the cylinder 126 above the piston and the pipe 145 and which pipe is in turn connected with a fluid supply pipe 146. The interior of the cylinder 127 has communication with the supply pipe 146 through the hollow piston rod 143 and the interior of the cylinder 125 has communication with a supply pipe 146, through the medium of a pipe 147, connected with the supply pipe 146, as shown more clearly in Figures 6 and 7, and which pipe 147 has communication with an opening 148 extending through the piston 139.

The cylinder 126 is provided with an opening 149 leading therefrom and beneath the piston 140, while the cylinder 127 is provided with a similar opening 150 leading therefrom below the piston 141. These openings 149—150 are connected by means of a pipe 151 (see particularly Figures 6 and 7) to form a by pass communication between the cylinders 126—127 beneath the pistons. Connected with the pipe 151 is a pipe 152 to which is connected a valve casing 153 having a valve 154 therein. The casing 153 is provided with an opening 155, which has communication with a source of supply of fluid preferably by means of a flexible connection 156. The casing 153 is also provided with an outlet 157 having communication with the atmosphere so that when the valve 154 is positioned to establish communication between the inlet 155 and the pipe 152 fluid will be admitted into the cylinders 126—127 beneath the respective pistons 140—141 and the outlet 157 will be closed. When the valve 154 is adjusted to establish communication between the pipe 152 and the outlet 157 leading to the atmosphere the inlet pipe 155 will be closed and the fluid which is beneath the pistons 140—141 in the respective cylinders 126—127 will be delivered therefrom and into the atmosphere through the opening 157.

Any suitable means may be provided for actuating the valve 154 such as a trigger 158 pivotally mounted as at 159 on a bracket 159ª preferably secured to the beam 128. This trigger is provided with a bifurcation 160, into which a pin 161 projects and which pin is carried by a support 162 carried by the pressure pad. A second pin 161ª may also be mounted upon the support 162 to engage the trigger 158 to insure an actuation of the trigger and these pins 161 and 161ª may be adjusted with respect to their support. The valve 154 is provided with a bifurcated arm 163, adapted to receive a pin or projection 164 carried by the trigger 158, so that when the cylinders move in one direction the trigger 158 will be rocked by the pin 161, to position the valve 154 as shown in full lines in Figure 11, so as to form communication between the pipes 155 and 152 and close the outlet 157, but when the cylinders move in the opposite direction the trigger 158 will be correspondingly shifted the valve will be again adjusted and into the position shown in dotted lines in Figure 11, so as to close the pipe 155 and establish communication between the pipe 152 and the outlet 157 discharging to the atmosphere. The trigger and bifurcated arm 163 are so connected that when the trigger is rocked to shift the valve 154, the valve will be operated with a quick and positive movement which prevents loss of fluid.

In this form of the invention a pin plate 136ª preferably rests upon the top plate 136 of the cylinder 127 and constitutes the support for the pins 165 and upon which pins 165 the draw ring rests, with the result that when the draw ring is depressed in the operation of the press, the cylinders 125—126—127 will, through the medium of the pins 165, be depressed against the pressure in the cylinders and above the pistons.

The connection between the pipes 145 and 146 is controlled by a three way valve 166 in a casing 167. Another three way valve 168 is arranged in a casing 169 which latter has communication with the valve casing 167 by means of the pipe 146ª, the valve 168 controlling communication between the pipes 147 and 146ª. This casing 169 is provided with an outlet 170 having communication with the atmosphere and which outlet is also controlled by the valve 168. The valves 166—168 are preferably connected by means of a link 171 and to this link is connected one end of a lever 172 pivoted intermediate its ends as at 173, the other end of the lever being provided with a projection 174 extending laterally therefrom. It will thus be seen that when the lever 172 is rocked about its pivot the valves 166—168 will be shifted through the medium of the link 171.

Any suitable means may be provided for automatically rocking this lever and to that end there is provided a trip 175 pivotally mounted as at 176 upon an extension 177 or arm carried by the wall of the lowermost cylinder 125. This trip is provided with a nose or projection 178 adapted to engage a bracket or projection 179 carried by the support 134, so that when the cylinders descend the nose 178 of the trip 175 will engage the bracket 179 and swing the trip to a position that it will rock the lever and at the same time pass over the projection 174 on the lever 172.

The valves 166—168 are shifted in the opposite direction when the cylinders recede or ascend in any suitable manner, preferably by means of a rod 180, one end of which is pivotally connected as at 181 with the lever 172 and the other end is connected to any suitable moving portion of the press such as the knock out or knock out operating arm 182.

It is thought that the operation of this form of the invention will be fully understood from the foregoing but briefly stated it is as follows. At the commencement of the forming operation the pistons 139—140—141 and the cylinders 125—126—127, will be in the position shown in Figure 5. The valves 166—168 will be in the position shown in Figure 9, and the valve 154 will be in the full line position as shown in Figures 10 and 11.

When the ram begins to descend the pins exert a pressure on the pressure pad 136ª causing the cylinders 125—126 and 127 to descend against the pressure from the pipe 146 on the upper sides of all of the pistons 139—140—141. At a predetermined point in this downward movement of the pressure pad 136ª the valve 154 is operated to establish communication between the pipes 156 and 152, which latter leads to the bottom sides of the pistons 140—141 in the cylinders 126—127, at the same time closing the opening 157 which communicates with the atmosphere. The fluid pressure on the top and bottom sides of the pistons 140—141 in the cylinders 126—127 will then be equalized.

At another predetermined point in the downward movement of the pressure pad 136ª, the trigger 175 will rock the lever 172 to operate the valve 166, to cut off communication between the pipe 146 and the pipe 146ª, thereby shutting off communication between the pipes 146 and 146ª. At the same time the valve 168 will be operated to establish communication between pipe 147 and the outlet 170 to the atmosphere, thereby relieving the pressure on the upper side of piston 139 in the cylinder 125.

The pressure in the cylinders 126—127 being now equalized on both sides of the respective pistons 140—141, and the pressure having been removed from the upper side of the piston 139 in the cylinder 125, it will be manifest that the cylinders with the pressure pad 136ª will gravitate, to a predetermined point and which gravitation is affected after the completion of the forming operation upon the work.

On the return stroke, the rod 180 operates the valves 166 and 168 simultaneously through the medium of the link 171, to cause the valve 166 to assume a position to maintain communication between the pipes 143 and 146, and at the same time establish communication between the pipes 146 and 146ª. The valve 168 is also operated to establish communication between the pipe 146ª and 147, thereby establishing a direct communication between the pipe 146 and through the valve 166, pipe 146ª, valve 168, and pipe 147 to the top side of the piston 139 in the cylinder 125, at the same time the valve 168 will cut off communication between the pipe 147 and the opening 170 to the atmosphere. The pressure being now exerted on the upper side of the piston 139 in the cylinder 125, and the pressure in the cylinders 126—127 on the opposite sides of the pistons 140—141 still being maintained neutralized, it will be manifest that the pressure thus exerted in the cylinder 125 will raise the pressure pad 136ᵃ back towards its normal position. During this portion of the return movement and at a predetermined point in the cycle of operation, the valve 154 will be operated to establish free communication between the cylinders 126—127 on the bottom sides of the pistons 140—141 with the atmosphere through the connections 149—150, pipes 151, 152, valve 154 and through the opening 157, at the same time the valve 154 will cut off communication between the pipe 156 and the lower sides of the pistons 140—141 through the respective openings 149—150.
At this point in the operation the parts will be in positions that the full fluid pressure is exerted against the top of all three pistons and the press and cushion are again in their original or normal positions.
While the construction and operation of the form of the invention shown in Figure 1 is described so as to cause the operation of the valve 58 in advance of the valve 35, it is to be understood that the trigger 64 may be adjusted upon the rod 62 and the screw 82 adjusted with respect to the rod 80 so as to cause the valve 35 to be actuated in advance of the valve 58.

It will be manifest that with this invention it is possible to draw a shell of a depth substantially equal to the limit of the stroke of the press, whereas heretofore it has only been possible to draw a shell of a depth equal to substantially only one-half of the stroke of the press, for the reason that space must be allowed to lift out or remove the formed shell from the press.

It is sometimes desired or necessary in the construction or shaping of certain forms, such as irregular forms, to exert different gripping pressures upon different parts of the blank being shaped, and in order to accomplish this end means must be provided whereby the pressure in the different cylinders may be varied with respect to each other. This may be accomplished in any suitable manner but a simple and efficient means will now be described, and while in the form of the invention shown in Figure 1, this controlling means is illustrated as being applied to one of the cylinders, it is to be understood that the device or mechanism may be applied to as many cylinders or groups of cylinders as is desired or necessary.

To this end a suitable controlling valve designated generally by the reference numeral 183 is arranged in the pipe connection 42ᵃ with the bottom cylinder 18.
Any suitable form of controlling valve may be provided and in the present form the valve casing is provided with a wall 184, having an opening 185, which is controlled by a valve 186, the latter being influenced by the diaphragm 187, and the diaphragm has acting thereupon a spring 188, which may be adjusted by means of an adjusting screw 189.

A pressure gauge 190 may be provided if desired and the valve casing 183 is provided with an outlet 191, which has connection with a coupling 192, the latter being in communication with the pipe 42ᵇ, which forms an extension of the pipe connection 42ᵃ and has communication with the cylinder 18.

Leading from the coupling 192 is a pipe 193, which in turn is connected with a valve casing 194, having a discharge outlet 195, leading to the atmosphere. Within the casing 194 is a valve 196 which is controlled by a spring 197, and the tension of the spring may be adjusted by means of a suitable adjusting screw 198.

The tension of the spring 197 tends normally to hold the valve 196 seated so as to cut off communication between the pipe 193 and the outlet 195. The spring 188 is so arranged that it tends normally to hold the valve 186 unseated.

In use the fluid under pressure enters the pipe 39, flows through the pipe 40 and into the pipe 42ᵃ, to be discharged through the opening 184 in the valve casing 183, on one side of the deflector 187. The fluid will then pass through the outlet 191, into the coupling 192, through the pipe 42ᵇ, and into the cylinder 18. The fluid will continue to flow and the pressure will be exerted in the cylinder 18 until a predetermined pressure is obtained in the cylinder 18 and this initial predetermined pressure is controlled by the adjusting of the screw 189, to vary the tension of the spring 188, which operates in opposition to the diaphragm 187. When the pressure has reached a predetermined degree the diaphragm 187 will be deflected and the valve 186 will be closed to shut off any further pressure, at the same time maintaining the pressure in the cylinder 18.

When the piston 20 is descending the fluid in the cylinder 18 will be prevented from escaping by reason of the fact that the valve 186 is closed and the valve 196 is also closed. This valve 196 may be set to operate at any desired pressure.

It will therefore be manifest that as the piston 20 descends the fluid pressure in the cylinder 18 may be controlled at will by the control of the valves 196 and 186. This permits of the obtaining of an even or uneven pressure in the cylinder 18, during the cycle of operation of the piston.

It will also be manifest that with this improved construction the pressure in any one or more of the cylinders or groups of cylinders may be controlled at will, and it is also possible to obtain different pressures in the different cylinders or different groups of cylinders.

While the preferred forms of the invention have been herein shown and described it is to be understood that various changes may be made in the details of construction, and in the combination and arrangement of the several parts, within the scope of the claims, without departing from the spirit of this invention.

What is claimed as new is:—

1. A pressure pad for sheet metal presses, said pad being operable as a blank holding means during a portion of the cycle of operation of the press, and means for causing the pad to drop beyond the bottom of the operative stroke of the press during another portion of the same cycle of operation of the press.

2. A pressure pad for sheet metal presses, said pad being operable as a blank holding means during a portion of the cycle of operation of the press, and means operating automatically to cause the pad to drop beyond the bottom of the operative stroke of the press during another portion of the same cycle of operation of the press.

3. A fluid pressure pad for sheet metal presses, said pad being operable as a blank holding means during a predetermined portion of the cycle of operation of the press, and means for causing the pad to drop beyond the bottom of the operative stroke of the forming operation during another portion of the same cycle of operation of the press.

4. A fluid pressure pad for sheet metal presses, said pad being operable as a blank holding means during a predetermined portion of the cycle of operation of the press, and means operating automatically to cause the pad to drop beyond the bottom of the operative stroke of the forming operation during a predetermined portion of the same cycle of operation of the press.

5. A pressure pad for sheet metal presses, said pad being operable as a blank holding means during a portion of the cycle of operation of the press, means for causing the pad to move beyond the operative stroke of the press during a portion of the same cycle of operation of the press, and means whereby the extent of the said movement may be varied.

6. A fluid pressure pad for sheet metal presses, said pad being operable as a blank holding means during a portion of the cycle of operation of the press, means for causing the pad to move beyond the limit of the forming operation during a portion of the same cycle of operation of the press, and means whereby the said movement may be varied at will.

7. A fluid pressure pad for sheet metal presses, said pad being operable as a blank holding means during a portion of the cycle of operation of the press, means operating automatically to cause the pad to move beyond the operative stroke of the press during a portion of the same cycle of operation of the press and after the forming operation, and means whereby the said movement may be varied at will.

8. A fluid pressure pad for sheet metal presses, said pad being operable as a blank holding means during a portion of the cycle of operation of the press, and means for automatically arresting the movement of the pad at a predetermined time in the same cycle of operation of the press.

9. A fluid pressure pad for sheet metal presses, said pad being operable as a blank holding means during a portion of the cycle of operation of the press, and means for automatically arresting the movement of the pad at a predetermined time in the same cycle of operation of the press, the said pad being also operable to lift the finished work out of the die.

10. In a sheet metal press, gripping means for the material, a pressure pad influencing the said gripping means, means operating automatically for arresting the movement of the pad, and means for causing the pad to exert a substantially unvarying pressure upon the gripping means.

11. In a sheet metal press, gripping means for the material, a fluid pressure pad influencing the said gripping means, means adapted to be set to automatically arrest the movement of the pad, and means for causing the pad to exert a substantially unvarying pressure upon the gripping means.

12. A pressure pad for sheet metal presses embodying a cylinder and piston movable one with relation to the other, means for exerting a resistance pressure upon one side of the piston, and means for equalizing the pressure on the other side of the piston at a predetermined time in the operation of the press.

13. A pressure pad for sheet metal presses embodying a cylinder and piston movable one with relation to the other, means for exerting a resistance pressure upon one side of the piston, and means operating automatically to neutralize such pressure upon the piston at a predetermined time in the operation of the press.

14. A pressure pad for sheet metal presses embodying a cylinder and piston movable one with relation to the other, fluid means exerting a pressure upon one side of the piston for causing a resistance to one direction of movement of the movable part, and means whereby an equal pressure may be exerted upon the other side of the piston to neutralize the first recited pressure.

15. A pressure pad for sheet metal presses embodying a cylinder and piston movable one with relation to the other, fluid means exerting a pressure upon one side of the piston for causing a resistance to one direction of movement of the movable part, and means for causing at a predetermined time in the operation of the pad an equal fluid pressure upon the other side of the piston to neutralize the first recited fluid pressure.

16. A pressure pad for sheet metal presses embodying a cylinder and piston movable one with relation to the other, fluid means exerting a pressure upon one side of the piston for causing a resistance to one direction of movement of the movable part, and means operating automatically to cause an equal fluid pressure upon the other side of the piston to neutralize the first recited pressure.

17. A pressure pad for sheet metal presses embodying a cylinder and piston movable one with relation to the other, fluid means exerting a pressure upon one side of the piston for causing a resistance to one direction of movement of the movable part, and means responsive in its operation to the movement of the movable part of the cushion for causing an equal fluid pressure upon the other side of the piston to neutralize the first recited pressure.

18. A pressure pad for sheet metal presses embodying a plurality of cylinders and pistons, the respective cylinders and pistons being movable one with relation to the other, means for exerting a resistance pressure in the cylinders on one side of the respective pistons, means whereby the pressure may be relieved from certain of said cylinders, and means for neutralizing the pressure on both sides of the piston in certain of said cylinders.

19. A pressure pad for sheet metal presses embodying a plurality of cylinders and pistons, the respective cylinders and pistons being movable one with relation to the other, means for exerting a substantially unvarying resistance pressure in the cylinders on one side of the respective pistons, means whereby the pressure may be relieved from certain of said cylinders, and means for neutralizing the pressure on both sides of the piston in certain of said cylinders.

20. A pressure pad for sheet metal presses embodying a plurality of cushions, means for causing a substantially unvarying resistance pressure upon the cushions, means operable by a moving part of the press for removing the pressure upon certain of said cushions, and means for neutralizing the pressure of certain of said cushions.

21. A pressure pad for sheet metal presses embodying a plurality of cushions, means for causing a substantially unvarying resistance pressure upon the cushions, means responsive in its operation to a moving part of the press and operating automatically to remove the pressure upon certain of said cushions, and means operating automatically to neutralize the pressure upon certain of said cushions.

22. A pressure pad for sheet metal presses embodying a plurality of cushions, means for causing a substantially unvarying fluid pressure upon the cushions, means responsive in its operation to a moving part of the press and operating automatically to remove the fluid pressure upon certain of said cushions, and means operating automatically to neutralize the fluid pressure upon certain of said cushions.

23. A fluid pressure pad for sheet metal presses embodying a cylinder and piston movable one with relation to the other, means for delivering a fluid pressure against one side of the piston, and means operating automatically to transfer a portion of the fluid to the other side of the piston to equalize the fluid pressure on both sides of the piston.

24. A fluid pressure pad for sheet metal presses embodying a cylinder and piston movable one with relation to the other, means for delivering a fluid pressure against one side of the piston, means operating automatically to transfer a portion of the fluid to the other side of the piston to equalize the fluid pressure on both sides of the piston, and means for controlling the last recited means whereby the time of transfer of the said fluid may be varied at will.

25. A pressure pad for sheet metal presses, embodying means for causing a fluid pressure to be exerted upon the pad, and means operating automatically for shutting off or relieving all of the fluid pressure from the pad at a predetermined point of operation of the device.

26. A fluid pressure pad for sheet metal presses embodying means for causing a fluid pressure to be exerted upon the pad, and means operating automatically by a moving part of the press to shut off or relieve the fluid pressure from the pad at a predetermined point of operation of the device.

27. A fluid pressure pad for sheet metal presses embodying means for causing a fluid pressure to be exerted upon the pad, and means operating automatically for shutting off or reducing the fluid pressure from the pad.

28. A pressure pad for sheet metal presses embodying a cylinder and piston movable one with relation to the other, means for causing such relative movement of the piston and cylinder for creating a resistance due to pressure in the cylinder, and means for relieving such pressure the last said means being operable automatically.

29. A pressure pad for sheet metal presses embodying a cylinder and piston movable one with relation to the other, means for creating relative movement of the cylinder and piston for creating a resistance due to pressure in the cylinder, and means for varying such pressure the last said means being automatically operable.

In testimony whereof I have signed my name to this specification, on this 17th day of January, A. D. 1922.

MARTIN BALCKER.